United States Patent [19]

Yoneya

[11] 4,120,113
[45] Oct. 17, 1978

[54] POUND FISHING NET STRUCTURE

[75] Inventor: Kiyoo Yoneya, Kurobe, Japan

[73] Assignee: Yoshida Kogyo K.K., Japan

[21] Appl. No.: 761,449

[22] Filed: Jan. 21, 1977

[30] Foreign Application Priority Data

Jan. 24, 1976 [JP] Japan .................. 51/6626[U]

[51] Int. Cl.$^2$ .............................................. A01K 69/00
[52] U.S. Cl. ........................................................ 43/100
[58] Field of Search ..................... 43/100, 14

[56] References Cited

U.S. PATENT DOCUMENTS

| 137,930 | 4/1873 | Ketcham | 43/100 |
|---|---|---|---|
| 355,269 | 12/1886 | Johnson | 43/100 |
| 1,556,401 | 10/1925 | Beckmann | 43/100 |
| 1,636,096 | 7/1927 | Hosko | 43/100 |
| 3,906,654 | 9/1975 | Leslie | 43/100 X |

FOREIGN PATENT DOCUMENTS 43,829  12/1927  Norway .................... 43/100

Primary Examiner—Louis G. Mancene
Assistant Examiner—Daniel J. Leach
Attorney, Agent, or Firm—Bucknam and Archer

[57] ABSTRACT

A pound or set net has a plurality of trap pockets for entrapping a school of fish, each pocket formed by a ceiling webbing of net, a bottom webbing and a peripheral webbing. A sliding fastener is provided on the ceiling webbing in particular, whereby the pocket may be quickly opened to remove driftwood or other floating foreign materials entrapped therein. There is also provided a fish outlet at the after end of the peripheral webbing which is normally closed by a slide fastener.

3 Claims, 1 Drawing Figure

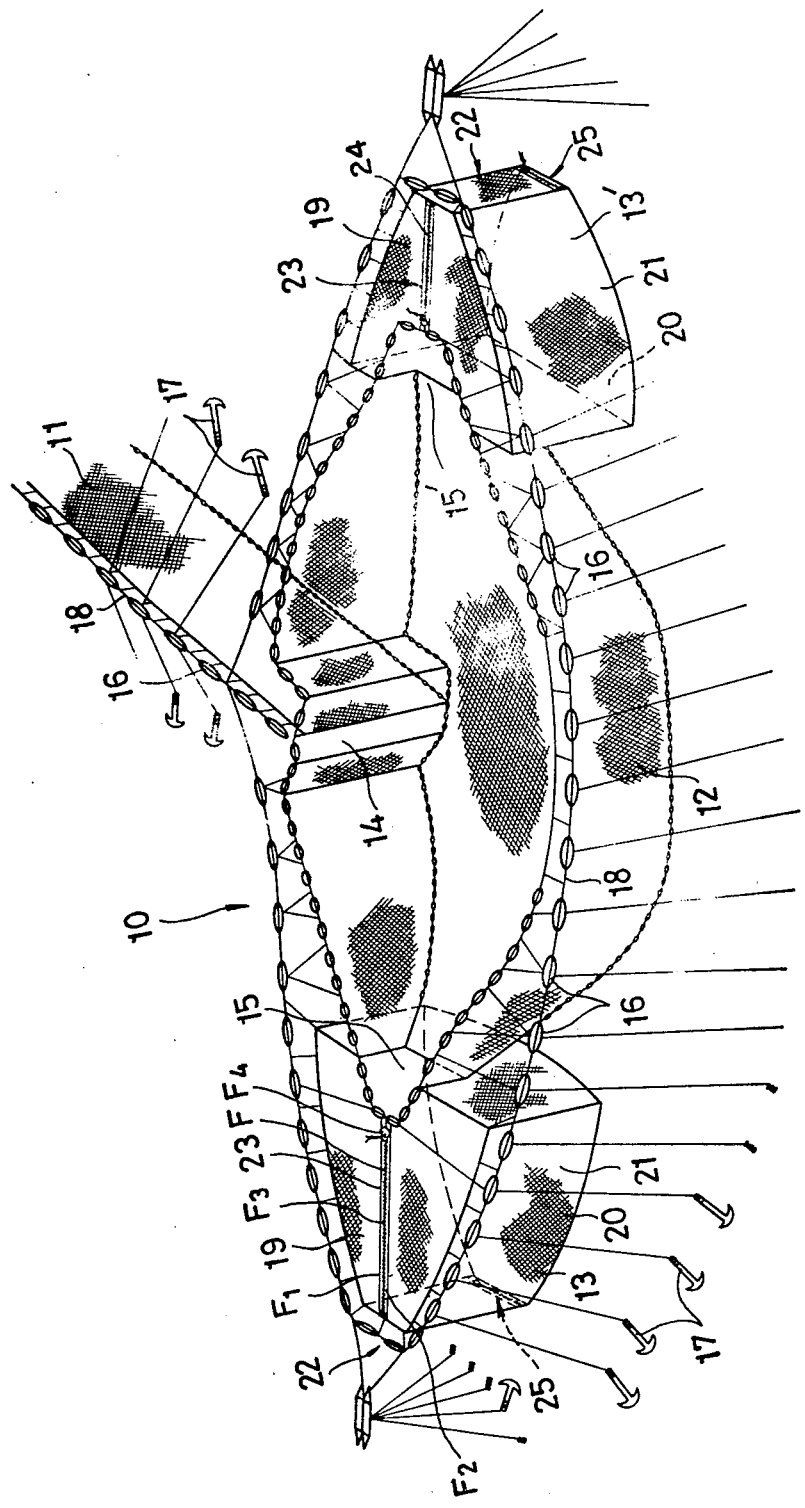

POUND FISHING NET STRUCTURE

BACKGROUND OF THE INVENTION

1. Field of the Invention

This invention relates to a fishing net, more particularly to a pound or set net for capturing a school of fish.

2. Prior Art

A typical pound net structure known in the art usually comprises a fence net along which the fish follows in an attempt to get past it, a vestibule enclosure net and one or more trap nets or pockets in which the fish is entrapped. There are frequent occasions in which driftwood or other objectionable barriers flow into the trap nets, damaging the same or scaring the fish out of the pockets. Therefore, it has always been an important task to get rid of such foreign materials in order to maintain normal fishing operation.

Since driftwood or the like tends to gather around and stick to the ceiling of the trap net, it was necessary to spread the fish outlet open wide enough by untying the ropes that had closed the outlet. This operation was not only time-consuming and tedious but also invited an escape of the fish. In some emergency instances, the ceiling of the trap net had to be torn apart to remove a drift of large logs and thereafter mend the net by stitching or lacing.

SUMMARY OF THE INVENTION

It is therefore a primary object of the present invention to provide an improved pound or set net which will eliminate the aforesaid difficulties of the prior art structure.

A more specific object of the invention is to provide an improved trap net structure equipped with an opening and closing means for quick and easy removal of entrapped driftwood or the like.

According to the invention, there is provided a pound fishing net structure comprising a fence net, a vestibule enclosure net, a plurality of trap nets, each trap net comprising a ceiling webbing, a bottom webbing and a peripheral webbing having a fish outlet, said ceiling webbing having an elongated slit extending substantially over the full length of said ceiling webbing, and an opening and closing means attached to the edges of said slit for opening and closing the same.

The invention will be better understood from the following description taken in conjunction with the accompanying drawing which illustrates by way of example a preferred embodiment which the invention may assume in practice.

BRIEF DESCRIPTION OF THE DRAWING

The drawing illustrates in a perspective view a pound or set net constructed in accordance with the invention.

DETAILED DESCRIPTION OF THE PREFERRED EMBODIMENT

The net structure generally designated at 10 comprises a fence net 11, a vestibule enclosure net 12 and a plurality of trap nets or pockets 13. In the illustrated embodiment, there are provided two trap nets 13,13' on opposite sides of the enclosure net 12. The fence net 11 is held in vertical position as is well known such that the fish approaching the same are led therealong and through an entrance 14 into the enclosure net 12. The fish find their way finally into either of the two trap nets 13,13' through their respective entrances 15,15'. The entire pound net structure 10 is retained in place by floats 16, and sinkers 17 attached at spaced intervals to the ropes or wires 18 to which the various net sections are secured in a manner well known in the art.

The trap nets or pockets 13,13' which constitute an important aspect of the invention are each constructed with a ceiling or top webbing of net 19, a bottom webbing 20 and a peripheral webbing 21. The trap or pocket 13, (13') is tapered progressively from its forward end at which the entrance 15, (15') is located, toward its after end 22. There is provided an opening or elongated slit 23 in the ceiling net 19, the opening or slit 23 extending centrally between opposite tapered sides of the top webbing 19 substantially over its full length. To the marginal edges of the slit 23 is attached an opening and closing means 24 comprising a slide fastener F having a pair of stringer tapes $F_1$, $F_2$ each carrying a row of interlocking fastener elements $F_3$ and a slider $F_4$ adapted to take the two stringers into and out of engagement with each other. Advantageously, the slit 23 may be opened to a degree only corresponding to the size of driftwood chips that have been entrapped in the pocket 13, (13') close to its ceiling net 19 and closed quickly immediately upon removal of the entrapped driftwood simply by manipulating the slider $F_4$, while holding the escape of the fish to an absolute minimum.

There is provided another opening or slit 25 in the peripheral webbing 21 adjacent to the bottom webbing 20 at the after end 22 of the pocket 13, (13'), to which slit is attached a similar slide fastener F. This opening 25 may be used primarily for removal of the entrapped fish, but may also be conveniently utilized for removal of the driftwood or other foreign materials that have been carried into the pocket 13, (13').

The trap net or pocket 13, (13') thus equipped with the slide fastener F has an outstanding advantage in that the degrees of opening of the slit 23, (25) can be adjusted at will by the slider $F_4$ which may be moved swiftly a distance only required to get rid of the particular driftwood regardless of where in the pocket 13, (13') it may be entrapped and without causing substantial loss of the caught species. The operation of removal of driftwood and other floating foreign objects can thus be carried out far much faster and with greater ease than by the conventional rope handling.

What is claimed is:

1. A pound fishing net structure comprising a fence net, a vestibule enclosure net, a plurality of trap nets, each trap net comprising a ceiling webbing, a bottom webbing and a peripheral webbing having a fish outlet, said ceiling webbing having an elongated slit extending substantially over the full length of said ceiling webbing, and an opening and closing means attached to the edges of said slit for opening and closing the same.

2. A pound fishing net structure as defined in claim 1 wherein said fish outlet is a slit to which the opening and closing means is attached.

3. A pound fishing net structure as defined in claim 1 wherein said opening and closing means comprises a slide fastener.

* * * * *